(12) United States Patent
Imase et al.

(10) Patent No.: US 8,162,790 B2
(45) Date of Patent: Apr. 24, 2012

(54) ROLLING BALL TYPE TWO-STAGE LOW SPEED CHANGER DEVICE

(75) Inventors: Kenji Imase, Aichi (JP); Sukejiro Nagata, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 474 days.

(21) Appl. No.: 12/420,465

(22) Filed: Apr. 8, 2009

(65) Prior Publication Data
US 2010/0216585 A1 Aug. 26, 2010

(30) Foreign Application Priority Data

Feb. 23, 2009 (JP) .................... P 2009-38785

(51) Int. Cl.
  *F16H 1/32* (2006.01)
  *F16H 23/00* (2006.01)
(52) U.S. Cl. ...................... 475/168; 475/164
(58) Field of Classification Search ........... 475/162, 475/163, 164, 168
See application file for complete search history.

(56) References Cited

U.S. PATENT DOCUMENTS

| | | | | |
|---|---|---|---|---|
| 4,584,904 A | * | 4/1986 | Distin et al. | 475/168 |
| 4,643,047 A | | 2/1987 | Distin et al. | 74/804 |
| 4,829,851 A | * | 5/1989 | Imase | 475/168 |
| 5,197,930 A | * | 3/1993 | Imase | 475/168 |
| 5,286,236 A | * | 2/1994 | Hosokawa et al. | 475/168 |

FOREIGN PATENT DOCUMENTS

| | | | |
|---|---|---|---|
| EP | 107485 A1 | * | 5/1984 |
| JP | 1-21378 B2 | | 4/1989 |
| JP | 05231490 A | * | 9/1993 |
| JP | 2003-172419 A | | 6/2003 |
| JP | 2006077833 A | * | 3/2006 |

OTHER PUBLICATIONS

Hidetsugu Terada & Kenji Imase, *Motion Analysis of a Multistage Type Trochoidal Wave Ball Reducer*, International Conference on the Theory of Machines and Mechanisms, Technical University of Liberec, Sep. 2-4, 2008.

* cited by examiner

*Primary Examiner* — Roger Pang
(74) *Attorney, Agent, or Firm* — Morgan, Lewis & Bockius LLP (57) ABSTRACT

In a rolling ball type two-stage low speed changer device 1, empirical formulas are obtained as a relationship between number of first, second, third and fourth lobes $z1, z2, z3, z4$ of a hypo-based groove 6 (8) and an epi-based groove 7 (9). The relationship is represented by $z1>z2$, $z3>z4$, $z1-z2=2$, $z3-z4=2$ and $z3=n \times z2 \times \frac{1}{2}$ (n: integer), and enables to a precise and smooth rotational transmission without inviting differential slippage and incurring an irregular rotation and uneven torque transmission on an output shaft 16 within the practical usage, and reducing a thickness dimension to render a whole structure compact, achieving a high transmission efficiency without inviting a backlash, and attaining a high torque transmission with low noise.

19 Claims, 8 Drawing Sheets

(at first speed reduction stage)   (at second speed reduction stage)

$\begin{Bmatrix} Z2 > Z1 \\ Z4 > Z3 \end{Bmatrix}$

$e1 = e2 + e3$ (at first speed (trans- (at second speed
reduction stage) mission) reduction stage)

ROLLING BALL TYPE TWO-STAGE LOW SPEED CHANGER DEVICE

BACKGROUND OF THE INVENTION

1. Field of the Invention

The invention relates to a rolling ball type two-stage low speed changer device in which an eccentric disc is placed between a stationary disc and an output disc having a hypo-based groove or epi-based groove through rollable balls provided therebetween.

2. Description of Prior Art

In general, a rolling ball type speed changer device has been made to work only through a single one reduction stage. Upon determining a speed reduction ratio by e.g., ⅓, the number of lobes of an epicycloidal groove is six, and the number of lobes of a hypocycloidal groove is eight as a combination of the maximum number of lobes of a cycloid-related groove.

Since an entire length of the epicycloidal groove and that of the hypocycloidal groove are theoretically equal respectively, a circumferential difference of unit length appears by the ratio of eight to six per one single lobe.

With the decrease of the speed reduction ratio, the circumferential difference increases. The circumferential difference decreases in proportion with the increase of the speed reduction ratio. The rollable ball moves along the opposed grooves, the mutual length of which differs per one single lobe so as to produce a differential slippage against the groove.

The differential slippage causes an irregular torque-transmission to rotate an output shaft unevenly, thus redering a precise speed reduction movement incapable so as to loose a good transmission efficiency with no small heat production wrought due to a friction between the discs.

Typical rolling ball type speed changer devices have been introduced by Laid-open Japanese Patent Application Nos. 2006-077833 and 2003-172419 (referred to as first and second reference hereinafter).

In the first and second references, a cycloid-based guide groove is formed on both sides of a single eccentric disc. A stationary and output discs are placed to be mutually opposed with the eccentric disc interposed therebetween. To each side of the stationary disc and the output disc, a cycloid-based guide groove is provided.

More specifically, the first reference provides a right and left plate, each of which is mutually opposed and has a cycloid-based annular teeth. Between the right and left plates, a middle plate is provided which has annular teeth in a cycloid-based configuration. Rollable balls are placed between the annular teeth of the right and left plates. In accompany with the rotational movement of an input shaft, the middle plate eccentrically rotates to transmit the torque from the left plate to the right plate through the rollable balls so as to produce a reduced rotation from an output shaft.

On the other hand, the second reference provides first, second and third discs which are juxtaposed to space oppose each other. Each of the discs has a cycloid-based guide groove with rollable balls interposed therebetween. In accompany with the rotational movement of a crankshaft, the second disc eccentrically rotates to produce a reduced rotation from the third disc.

However, in each of the first and second references, there has been no successful example to actually insure a precise and smooth speed reduction. Even though it may be possible to combine any number of lobes between the discs having different cycloid-based grooves, it is by no means easy to implement a precise and smooth rotational transmission.

Why they have been unsuccessful can be generally explained based on the mechanical theory. Namely, there surmisably lies an inconsistent displacement of phase at the trochoidal movement between the two discs observed upon eccentrically rotating the input shaft.

Therefore, the invention is made to obviate the above drawbacks by rendering empirical formulas consistent in phase between lobes of the cycloid-based curves defined on discs to be effective within a practical usage.

It is an object of the invention to a rolling ball type two-stage low speed changer device which is capable of reducing a thickness dimension to render a whole structure compact, achieving a high transmission efficiency without inviting a backlash, attaining a high torque transmission with low noise, and insuring a precice and smooth rotational transmission without inviting the differential slippage and incurring any irregular rotation and uneven torque transmission.

SUMMARY OF THE INVENTION

According to the invention, there is provided a rolling ball type two-stage low speed changer device in which each of the first, second, third and fourth number of lobes are an integer. The first number of lobes is greater than the second number of lobes and the third number of lobes is greater than the fourth number of lobes, each difference between the first and second number of lobes and between the third and fourth number of lobes is two with the third number of lobes equal to an integral multiple of half of the second number of lobes.

When a rotational input is given to the eccentric shaft, the eccentric disc rotates to make the first rollable balls roll along the hypo-based groove of the stationary disc and the epi-based groove of the eccentric disc so as to implement a first stage speed change, while at the same time, making the second rollable balls roll along the hypo-based groove of the eccentric disc and the epi-based groove of the output disc so as to implement a second stage speed change.

Empirical formulas are obtained as a result of repeating experimentations and making prototype devices on an experimental basis.

first number of lobes>second number of lobes, third number of lobes>fourth number of lobes, first number of lobes−second number of lobes=2 third number of lobes−fourth number of lobes=2 third number of lobes=$n \times (½) \times$ second number of lobes (n: integer).

As a consequence of setting the above formulas, it becomes possible to insure a precise and smooth rotational transmission without inviting differential slippage and incurring an irregular rotation and uneven torque transmission within the practical usage. At the same time, it is possible to reduce a thickness dimension to render a whole structure compact, achieving a high transmission efficiency without inviting a backlash, and attaining a high torque transmission with low noise.

Specifically, it is possible to insure a rotational transmission within a low speed reduction range as precise and smooth as within a high speed reduction range by lessening the circumferential difference between the length of the first number of lobes (third number of lobes) and the length of the second number of lobes (fourth number of lobes) as much as possible.

According to other aspect of the invention, there is provided a rolling ball type two-stage low speed changer device in which each of the first, second, third and fourth number of lobes are an integer. The second number of lobes is greater than the first number of lobes and the fourth number of lobes is greater than the third number of lobes, each difference between the second and first number of lobes and between the fourth and third number of lobes is two with the third number of lobes equal to an integral multiple of half of the second number of lobes.

When a rotational input is given to the eccentric shaft eccentrically, the eccentric disc rotates to make the first rollable balls roll along the epi-based groove of the stationary disc and the hypo-based groove of the eccentric disc so as to implement a first stage speed change, while at the same time, making the second rollable balls roll along the epi-based groove of the eccentric disc and the hypo-based groove of the output disc so as to implement a second stage speed change.

Empirical formulas are obtained as a result of repeating experimentations and making on an experimental basis.

second number of lobes>first number of lobes, fourth number of lobes>third number of lobes, second number of lobes−first number of lobes=2, fourth number of lobes−third number of lobes=2 and third number of lobes=$n \times (1/2) \times$second number of lobes ($n$: integer).

The above formulas enable the device to insure a precise and smooth rotational transmission without inviting differential slippage and incurring an irregular rotation and uneven torque transmission within the practical usage. At the same time, it is possible to reduce a thickness dimension to render a whole structure compact, achieving a high transmission efficiency without inviting a backlash, and attaining a high torque transmission with low noise.

According to other aspect of the invention, the stationary disc has a main disc and an adjunctive disc, the latter of which has the hypo-based groove and is detachably attached to the main disc to be exchangeable with other adjunctive disc having a different number of lobes from the hypo-based groove.

Upon changing the speed reduction ratio, it is possible to implement the change by exchanging the adjunctive disc with other adjunctive disc. This renders less costly compared to the case in which the stationary disc is wholly remodeled.

According to other aspect of the invention, the eccentric disc has a main disc having the epi-based groove and an adjunctive disc, the latter of which has the hypo-based groove and is detachably attached to the main disc to be exchangeable with other adjunctive disc having a different number of lobes from the hypo-based groove.

Upon changing the speed reduction ratio, it is possible to implement the change by exchanging the adjunctive disc with other adjunctive disc. This renders less costly compared to the case in which the eccentric disc is wholly remodeled.

According to other aspect of the invention, the output disc has a main disc and an adjunctive disc, the latter of which has the epi-based groove and is detachably attached to the main disc to be exchangeable with other adjunctive disc having a different number of lobes from the epi based groove.

Upon changing the speed reduction ratio, it is possible to implement the change by exchanging the adjunctive disc with other adjunctive disc. This renders less costly compared to the case in which the output disc is wholly remodeled.

According to other aspect of the invention, the stationary disc has a main disc and an adjunctive disc, the latter of which has the hypo-based groove and is detachably attached to the main disc to be exchangeable with other adjunctive disc having a different number of lobes from the hypo-based groove. The eccentric disc has a main disc having the epi-based groove and an adjunctive disc, the latter of which has the hypo-based groove and is detachably attached to the main disc to be exchangeable with other adjunctive disc having a different number of lobes from the hypo-based groove.

Upon changing the speed reduction ratio, it is possible to implement the change by exchanging the adjunctive disc with other adjunctive disc. This renders less costly compared to the case in which the stationary disc and the eccentric disc are wholly remodeled.

According to other aspect of the invention, the stationary disc has a main disc and an adjunctive disc, the latter of which has the hypo-based groove and is detachably attached to the main disc to be exchangeable with other adjunctive disc having a different number of lobes from the hypo-based groove. The output disc has a main disc and an adjunctive disc, the latter of which has the epi-based groove and is detachably attached to the main disc to be exchangeable with other adjunctive disc having a different number of lobes from the epi-based groove.

According to other aspect of the invention, the eccentric disc has a main disc having the epi-based groove and an adjunctive disc, the latter of which has the hypo-based groove and is detachably attached to the main disc to be exchangeable with other adjunctive disc having a different number of lobes from the hypo-based groove. The output disc has a main disc and an adjunctive disc, the latter of which has the epi-based groove and is detachably attached to the main disc to be exchangeable with other adjunctive disc having a different number of lobes from the epi-based groove.

According to other aspect of the invention, the stationary disc has a main disc and an adjunctive disc, the latter of which has the hypo-based groove and is detachably attached to the main disc to be exchangeable with other adjunctive disc having a different number of lobes from the hypo-based groove. The eccentric disc has a main disc having the epi-based groove and an adjunctive disc, the latter of which has the hypo-based groove and is detachably attached to the main disc to be exchangeable with other adjunctive disc having a different number of lobes from the hypo-based groove. The output disc has a main disc and an adjunctive disc, the latter of which has the epi-based groove and is detachably attached to the main disc to be exchangeable with other adjunctive disc having a different number of lobes from the epi-based groove.

According to other aspect of the invention, the stationary disc has a main disc and an adjunctive disc, the latter of which has the epi-based groove and is detachably attached to the main disc to be exchangeable with other adjunctive disc having a different number of lobes from the epi-based groove.

According to other aspect of the invention, the eccentric disc has a main disc having the hypo-based groove and an adjunctive disc, the latter of which has the epi-based groove and is detachably attached to the main disc to be exchangeable with other adjunctive disc having a different number of lobes from the epi-based groove.

According to other aspect of the invention, the output disc has a main disc and an adjunctive disc, the latter of which has the hypo-based groove and is detachably attached to the main disc to be exchangeable with other adjunctive disc having a different number of lobes from the hypo-based groove.

According to other aspect of the invention, the stationary disc has a main disc and an adjunctive disc, the latter of which has the epi-based groove and is detachably attached to the main disc to be exchangeable with other adjunctive disc having a different number of lobes from the epi-based groove. The eccentric disc has a main disc having the hypo-based groove and an adjunctive disc, the latter of which has the epi-based groove and is detachably attached to the main disc to be exchangeable with other adjunctive disc having a different number of lobes from the epi-based groove.

According to other aspect of the invention, the stationary disc has a main disc and an adjunctive disc, the latter of which has the epi-based groove and is detachably attached to the main disc to be exchangeable with other adjunctive disc having a different number of lobes from the epi-based groove. The output disc has a main disc and an adjunctive disc, the latter of which has the hypo-based groove and is detachably attached to the main disc to be exchangeable with other adjunctive disc having a different number of lobes from the hypo-based groove.

According to other aspect of the invention, the eccentric disc has a main disc having the hypo-based groove and an adjunctive disc, the latter of which has the epi-based groove and is detachably attached to the main disc to be exchangeable with other adjunctive disc having a different number of lobes from the epi-based groove. The output disc has a main disc and an adjunctive disc, the latter of which has the hypo-based groove and is detachably attached to the main disc to be exchangeable with other adjunctive disc having a different number of lobes from the hypo-based groove.

According to other aspect of the invention, the stationary disc has a main disc and an adjunctive disc, the latter of which has the epi-based groove and is detachably attached to the main disc to be exchangeable with other adjunctive disc having a different number of lobes from the epi-based groove. The eccentric disc has a main disc having the hypo-based groove and an adjunctive disc, the latter of which has the epi based groove and is detachably attached to the main disc to be exchangeable with other adjunctive disc having a different number of lobes from the epi-based groove. The output disc has a main disc and an adjunctive disc, the latter of which has the hypo-based groove and is detachably attached to the main disc to be exchangeable with other adjunctive disc having a different number of lobes from the hypo-based groove.

According to other aspect of the invention, a speed reduction ratio is expressed by $\{1-(z1 \times z3/z2 \times z4)\}$ with $z1$, $z2$, $z3$ and $z4$ as the first, second, third and fourth number of lobes.

By way of illustration, the following calculation is obtained with $z1$, $z2$, $z3$ and $z4$ in turn as 16, 14, 14 and 12.

$$\{1(16 \times 14/14 \times 12)\} = \frac{1}{3}$$

The calculation means that an output shaft rotates in another direction with the speed reduction ratio as $\frac{1}{3}$.

According to other aspect of the invention, the eccentric disc has a first eccentric disc plate having the epi-based groove and a second eccentric disc plate having the hypo-based groove each located to be angularly offset in phase by 180 degrees. The first eccentric disc plate has a plurality of circular cavities provided along a basic circle on a surface opposite to the epi-based groove, and the second eccentric disc plate has a plurality of circular cavities provided along a basic circle on a surface opposite to the hypo-based groove to form an adjustment coupler in which rollable balls are placed in the circular cavities of the first and second eccentric disc plate.

With the first and second eccentric disc plate angularly offset in phase in phase by 180 degrees, it is possible to countervail the eccentrical force components of the first and second eccentric disc plate upon eccentrically rotating each other, so as to prevent vibration which would otherwise be produced due to the eccentric rotation of the eccentric disc.

According to other aspect of the invention, the eccentric disc has a first eccentric disc plate having the hypo-based groove and a second eccentric disc plate having the epi-based groove each located to be angularly offset in phase by 180 degrees. The first eccentric disc plate has a plurality of circular cavities provided along a basic circle on a surface opposite to the hypo based groove, and the second eccentric disc plate has a plurality of circular cavities provided along a basic circle on a surface opposite to the epi-based groove to form an adjustment coupler in which rollable balls are placed in the circular cavities of the first and second eccentric disc plate.

With the first and second eccentric disc plate angularly offset in phase by 180 degrees, it is possible to cancel the eccentrical force components of the first and second eccentric disc plate upon eccentrically rotating each other, so as to prevent vibration which would otherwise be produced due to the eccentric rotation of the eccentric disc.

BRIEF DESCRIPTION OF THE DRAWINGS

Preferred forms of the present invention are illustrated in the accompanying drawings in which.

DETAILED DESCRIPTION OF THE PREFERRED EMBODIMENTS

In the following description of the depicted embodiments, the same reference numerals are used for features of the same type.

Referring to FIGS. 1 through 4 which show a rolling ball type two-stage low speed changer device 1 according to a first embodiment of the invention, a cylindrical housing 2 has a diameter increased portion 2a and a diameter reduced portion 2b in the rolling ball type two-stage low speed changer device 1. Within the diameter-increased portion 2a, a stationary disc 3, an eccentric disc 4 and an output disc 5 are placed to be space opposed in parallel with each other.

Figure 1:
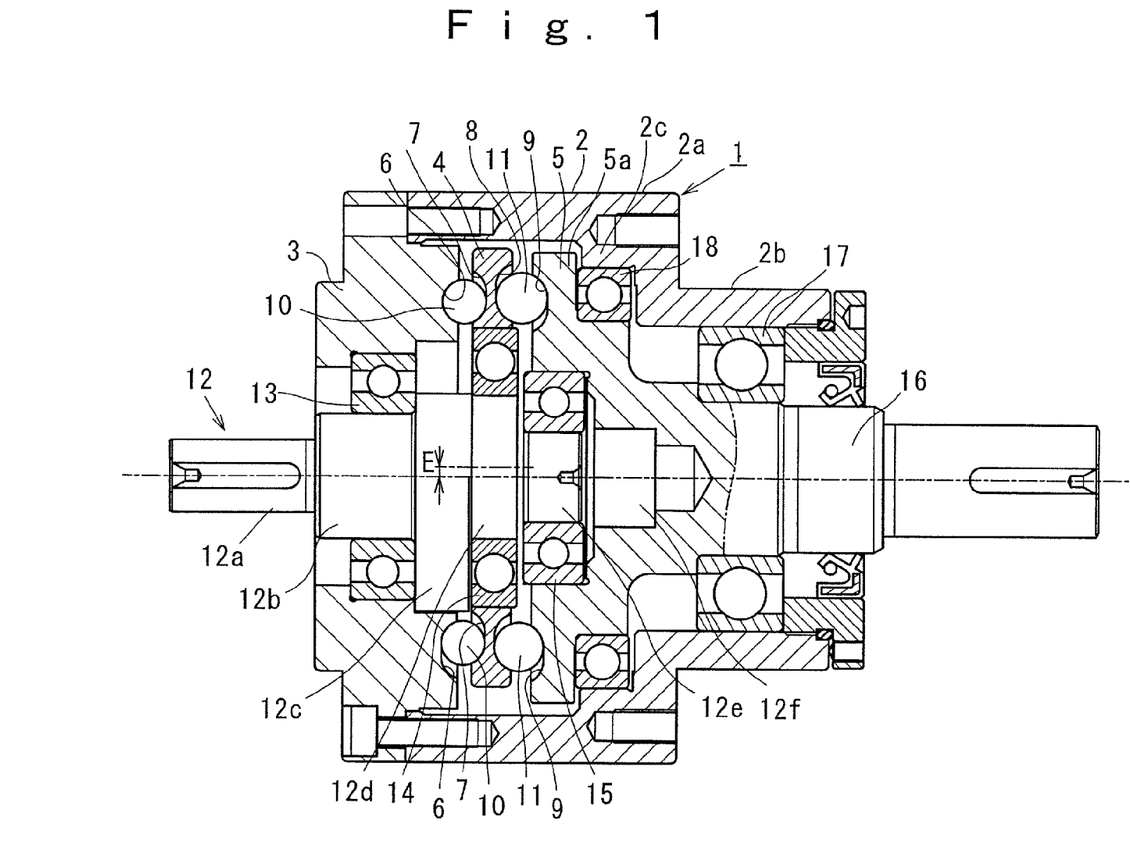
FIG. 1 is a longitudinal cross sectional view of a rolling ball type two-stage low speed changer device according to a first embodiment of the invention.
Figure 2:
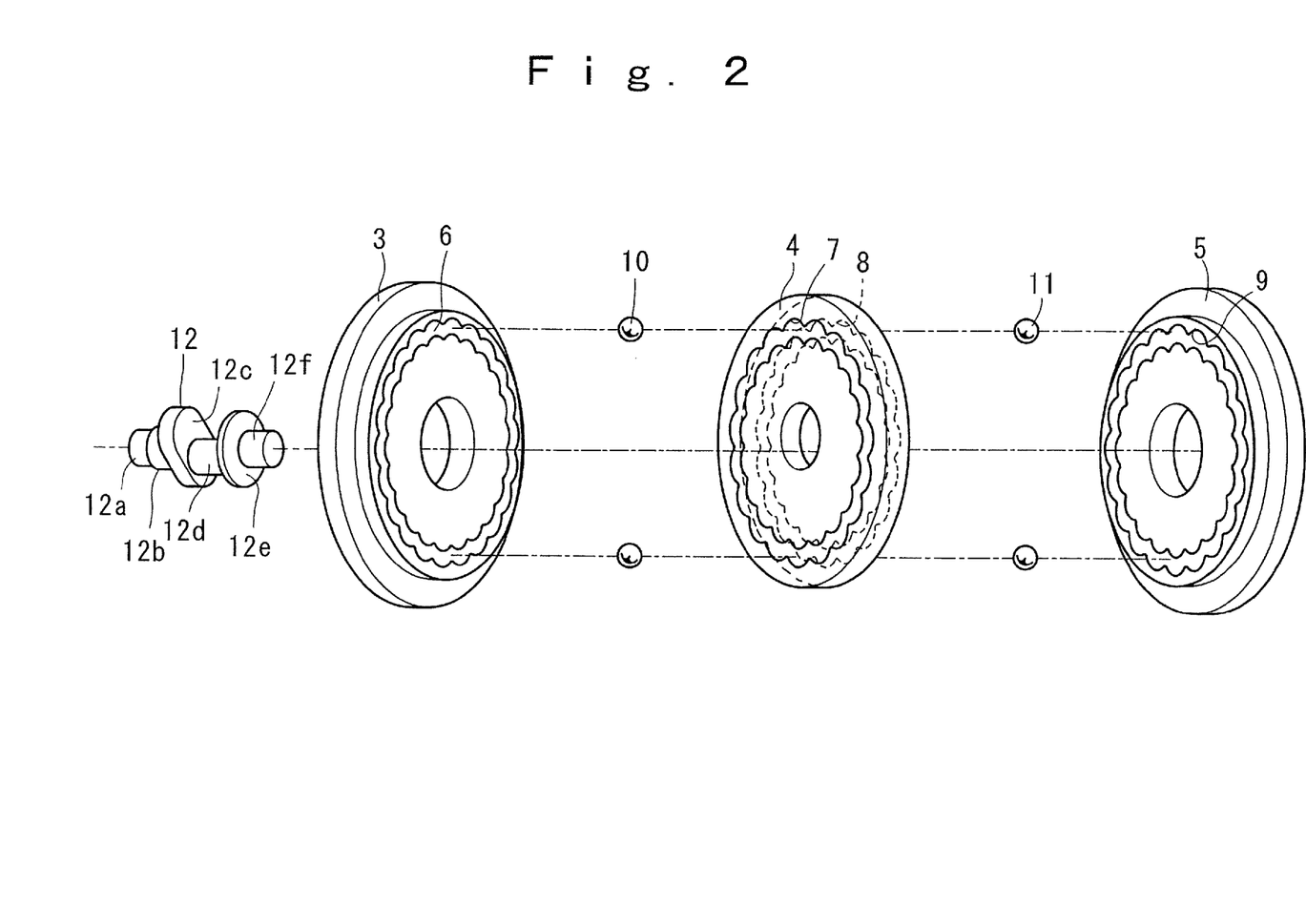
FIG. 2 is an exploded view of an eccentric shaft, a stationary disc, an eccentric disc and an output disc.

A hypo-based groove 6 is provided with one side surface of the stationary disc 3, and an epi-based groove 7 is formed on one side surface of the eccentric disc 4 in registry with the hypo-based groove 6. On the other side surface of the eccentric disc 4, a hypo-based groove 8 is defined. In registry with the hypo-based groove 8, an epi-based groove 9 is provided with one side surface of the output disc 5.

Between the stationary disc 3 and the eccentric disc 4, a plurality of first rollable balls 10 are provided, each of which partly engages with the hypo based groove 6 and partly engages with the epi-based groove 7.

Between the eccentric disc 4 and the output disc 5, a plurality of second rollable balls 11 are provided, each of which partly engages with the hypo-based groove 8 and partly engages with the epi-based groove 9. The first and second rollable balls 10, 11 are made of metallic material such as, for example, steel or mild steel.

Within the housing 2, an eccentric shaft 12 is disposed in perpendicular to the stationary disc 3, the eccentric disc 4 and the output disc 5. The eccentric shaft 12 has an input portion 12a, a first bulged portion 12b, a counter-weight portion 12c, an eccentric portion 12d, a second bulged portion 12e and a connection portion 12f.

The first bulged portion 12b is rotationally secured to a central portion of the stationary disc 3 by way of a first ball bearing 13. The eccentric portion 12d is pivotably secured to a central portion of the eccentric disc 4 by way of a second ball bearing 14.

The second bulged portion 12e is rotationally secured to a central portion of the output disc 5 by way of a third ball bearing 15. The connection portion 12f is rotationally secured at its end to a central portion of the output disc 5. It is to be noted that the eccentric shaft 12 is downscaled against the stationary disc 3, the eccentric disc 4 and the output disc 5 merely for the purpose of convenience.

From a central portion of the other side surface of the output disc 5, an output shaft 16 extends outside the diameter reduced portion 2b of the housing 2. The output shaft 16 is rotationally supported at a central portion of the diameter-reduced portion 2b by way of a fourth ball bearing 17.

In this instance, a stepped portion 2c is defined at a boundary between the diameter-increased portion 2a and the diameter-reduced portion 2b. Between the stepped portion 2c and an outer periphery of the output disc 5, a fifth ball bearing 18 is interposed. The eccentric shaft 12 is in a coaxial relationship with the output shaft 16, while an eccentricity of the eccentric portion 12d is equal to an eccentricity E of the eccentric disc 4 against the stationary disc 3 and the output disc 5.

FIG. 2 schematically shows the stationary disc 3, the eccentric disc 4 and the output disc 5. The hypo-based groove 6 has a first number of lobes $z_1$, and is circumferentially defined by a hypocycloidal curve along a basic circle (not shown). The eccentric disc 4 circumferentially defines the epi-based groove 7 to have a second number of lobes $z_2$ by an epicycloidal curve along the basic circle. The hypo-based groove 8 has a third number of lobes $z_3$ circumferentially defined by a hypocycloidal curve along the basic circle The output disc 5 circumferentially defines the epi-based groove 9 to have a fourth number of lobes $z_4$ by an epicycloidal curve along the basic circle.

After repeating experimentations and making prototype devices on an experimental basis, following empirical formulas A, B and C are obtained among the first number of lobes $z_1$, the second number of lobes $z_2$, the third number of lobes $z_3$ and the fourth number of lobes $z_4$.

$$z_1 > z_2, z_3 > z_4 \qquad\qquad A$$

$$z_1 - z_2 = 2, z_3 - z_4 = 2 \qquad\qquad B$$

$$z_3 = n \times z_2 \times \tfrac{1}{2} \ (n: \text{integer}) \qquad\qquad C$$

By way of illustration, when the first number of lobes $z_1$ is determined to be 24, and the second number of lobes $z_2$ determined to be 22 at the first speed reduction stage, the eccentric disc 4 is reduced at its rotational movement by the expression of $\{1-(24/22)=-1/11\}$.

With a single one rotation of the input portion 12a, the input portion 12a makes the eccentric disc 4 turn a single one revolution, while making the disc 4 rotationally move by the rate of 1/11 in another direction.

In order to consistently meet the third number of lobes $z_3$ for the second number of lobes $z_2$ in terms of phase, the third number of lobes $z_3$ must related to number 11.

After implementing experimentations, it turned out that the third number of lobes $z_3$ consistently meets the second number of lobes $z_2$ as long as the third number of lobes $z_3$ is an integral multiple of the numeral 11. As an integral multiple of number 11, the third number of lobes $z_3$ can be set in turn to be 11, 22, 33, 44 and the like.

Upon setting a low speed reduction ratio at the second speed reduction stage, it is necessary to reduce the rotational speed in such a manner as to retard the rotational displacement along the direction of the rotational output produced at the first speed reduction stage.

Based on the theory of the differential speed reduction in which a diameter increased disc and a diameter-reduced disc are combined, the third number of lobes $z_3$ must be greater than the fourth number of lobes $z_4$, while meeting the numerical relationship of $z_4 = z_3 - 2$.

In addition to the first and second number of lobes $z_1$, $z_2$ each determined at the first speed reduction stage, the second and third number of lobes $z_3$, $z_4$ are determined as follows:
the first number of lobes $z_1$=24, 24, 24
the second number of lobes $z_2$=22, 22, 22
the third number of lobes $z_3$=11, 22, 33
the fourth number of lobes $z_4$=9, 20, 31

Figure 3:
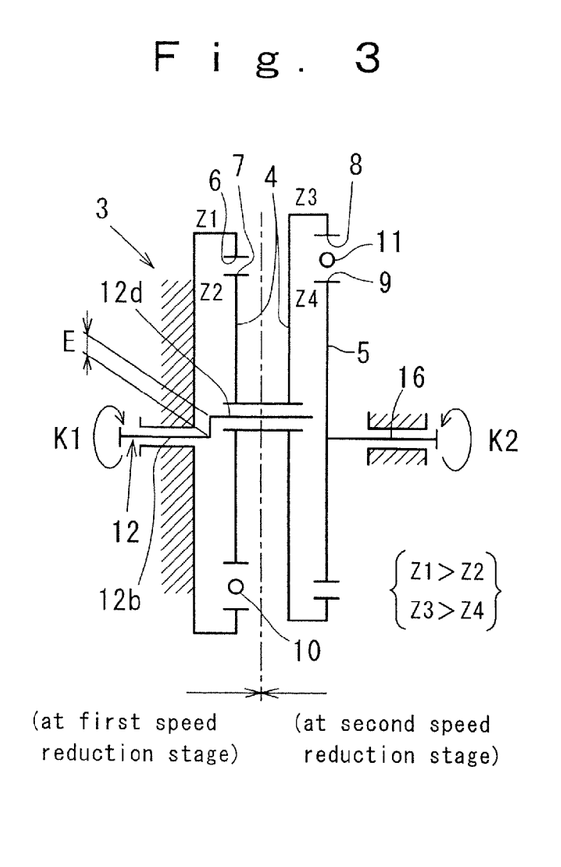
FIG. 3 is a schematic view of an equivalent model of the rolling ball type two-stage low speed changer device.

FIG. 3 shows an equivalent model of the rolling ball type two-stage low speed changer device 1, and the eccentric disc 4 eccentrically rotates by way of the eccentric portion 12d upon rotationally driving the eccentric shaft 12 in the direction of an arrow K1.

In this situation, the first rollable balls 10 roll along the hypo-based groove 6 of the stationary disc 3 and the epi-based groove 7 of the eccentric disc 4 at the first speed reduction stage.

In accompany with the movement of the eccentric disc 4, the second rollable balls 11 roll along the hypo-based groove 8 of the eccentric disc 4 and the epi-based groove 9 of the output disc 5 at the second speed reduction stage. At the time of implementing the second speed reduction stage, the output disc 5 rotate to transmit its rotation to the output shaft 16 in the direction of an arrow K2 opposite to the direction of the arrow K1.

Upon determining the first, second, third and fourth number of lobes $z_1$, $z_2$, $z_3$, $z_4$ to be 16, 14, 14, 12 in turn, the speed reduction ratio Re is calculated as follows:

$$Re = \left\{1 - \left(\frac{16 \times 14}{14 \times 12}\right)\right\}$$

$$= -\frac{1}{3}$$

The negative sign of the speed reduction ratio Re means that the rotational output is a direction reverse to that of the rotational input.

Figure 4:
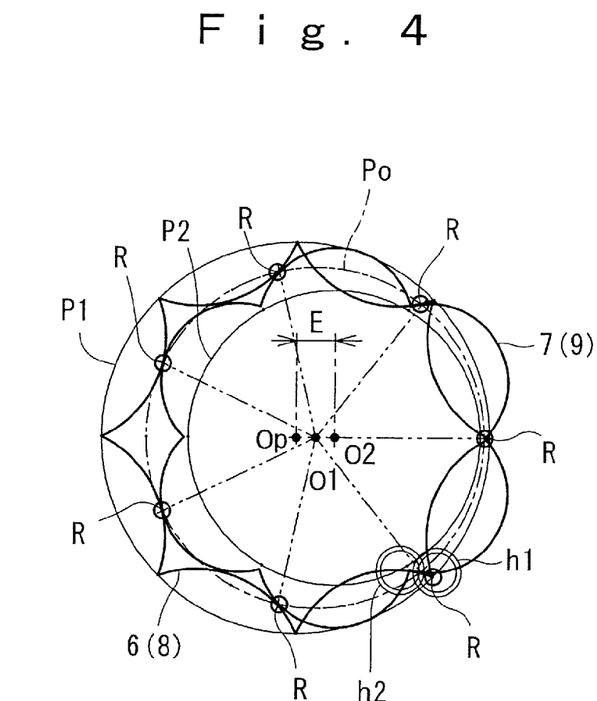
FIG. 4 is a schematic view depicted how to perform a torque transmission between an epi-based groove and a hypo-based groove.

FIG. 4 schematically shows a principle how the speed reduction is carried out between the hypo-based groove 6 (8) and the epi-based groove 7 (9). The eccentricity E which the eccentric disc 4 has against the stationary disc 3 and the output disc 5, is equivalent to a displacement between a center 01 of a basic circle P1 of the hypo-based groove 6 (8) and a center 02 of a basic circle P2 of the epi-based groove 7 (9).

A plurality of meshing points R are depicted in which the first and second rollable balls 10, 11 engage with each other at the hypo-based groove 6 (8) and the epi-based groove 7 (9). At the meshing points R, the rotational transmission is implemented from the hypo-based groove 6 (8) to the epi-based groove 7 (9), and forms a pitch circle Po circumferentially along the meshing points R around a center 0p.

A rolling circle at the epi based groove 7 (9) is encircled by a double circle h1, and a rolling circle of the hypo-based groove 6 (8) is encircled by a double circle h2.

With the structure thus described, the empirical formulas A, B, C are obtained as a result of repeating experimentations and making the prototype devices on the experimental basis.

As a consequence of setting the above formulas A, B, C, it becomes possible to insure a precise and smooth rotational transmission without inviting differential slippage and incurring an irregular rotation and uneven torque transmission within the practical usage. At the same time, it is possible to reduce a thickness dimension to render a whole structure compact, achieving a high transmission efficiency without inviting a backlash, and attaining a high torque transmission with low noise.

Specifically, it is possible to insure a rotational transmission within a low speed reduction range as precise and smooth as within a high speed reduction range by lessening the circumferential difference between the length of the first number of lobes z1 (third number of lobes z3) and the length of the second number of lobes z2 (fourth number of lobes z4) as much as possible.

Figure 5:
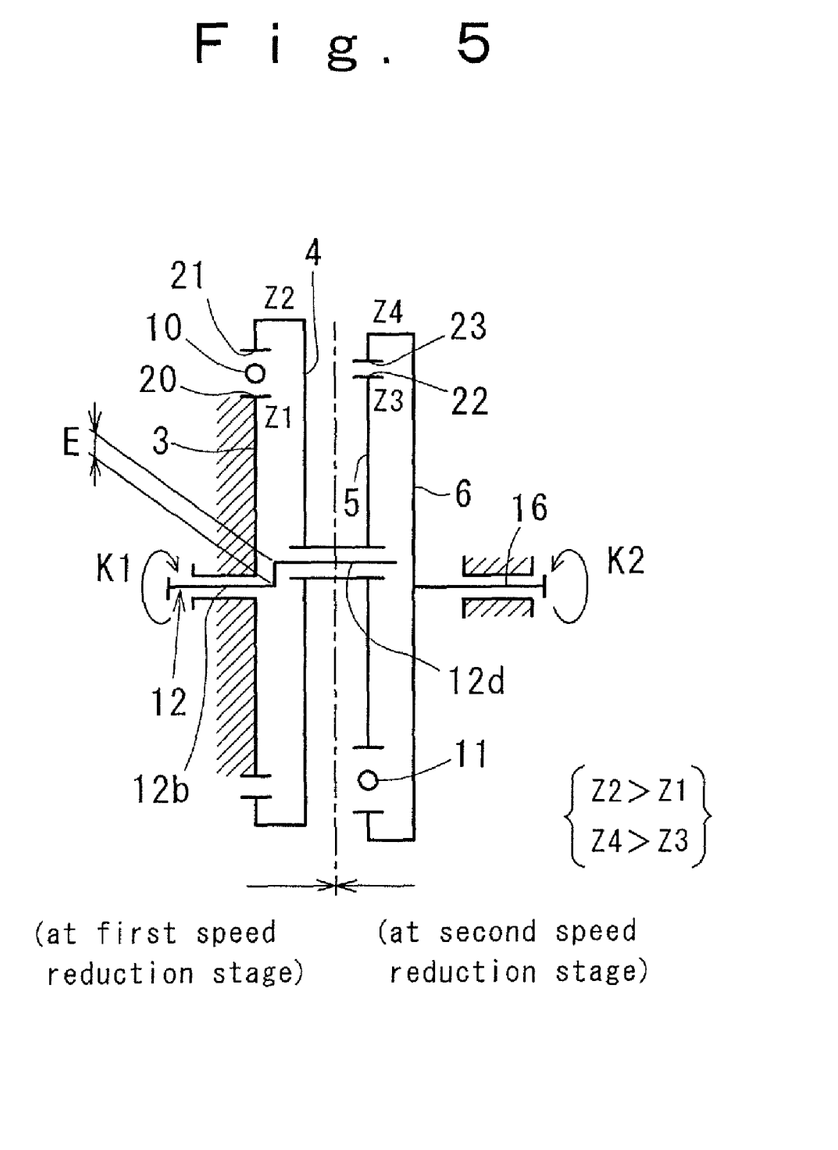
FIG. 5 is a schematic view of an equivalent model of a rolling ball type two stage low speed changer device according to a second embodiment of the invention.

FIG. 5 shows a second embodiment of the invention in which the hypo-based groove 6 (8) and the epi-based groove 7 (9) are alternately exchanged among the stationary disc 3, the eccentric disc 4 and the output disc 5.

Namely, the stationary disc 3 has an epi based groove 20 circumferentially defined along the epicycloidal curve with peripheral teeth as the first number of lobes z1. The eccentric disc 4 has a hypo-based groove 21 circumferentially defined along the hypocycloidal curve with peripheral teeth as the second number of lobes z2, and having an epi-based groove 22 circumferentially defined along the epicycloidal curve with peripheral teeth as the third number of lobes z3.

The output disc 5 has a hypo-based groove 23 circumferentially defined along the hypocycloidal curve with peripheral teeth as the fourth number of lobes z4.

Following empirical formulas A1, B1 and C1 are achieved among the first number of lobes z1, the second number of lobes z2, the third number of lobes z3 and the fourth number of lobes z4.

| | |
|---|---|
| z2>z1, z4>z3 | A1 |
| z2−z1=2, z4−z3=2 | B1 |
| z3=n×z2×½ (n: integer) | C1 |

With the epi-based groove 20 (22) and the hypo-based groove 21 (23) each set by the above formulas A1, B1 and C1, it is possible to attain the same advantages as insured by the first embodiment of the invention.

Figure 6:
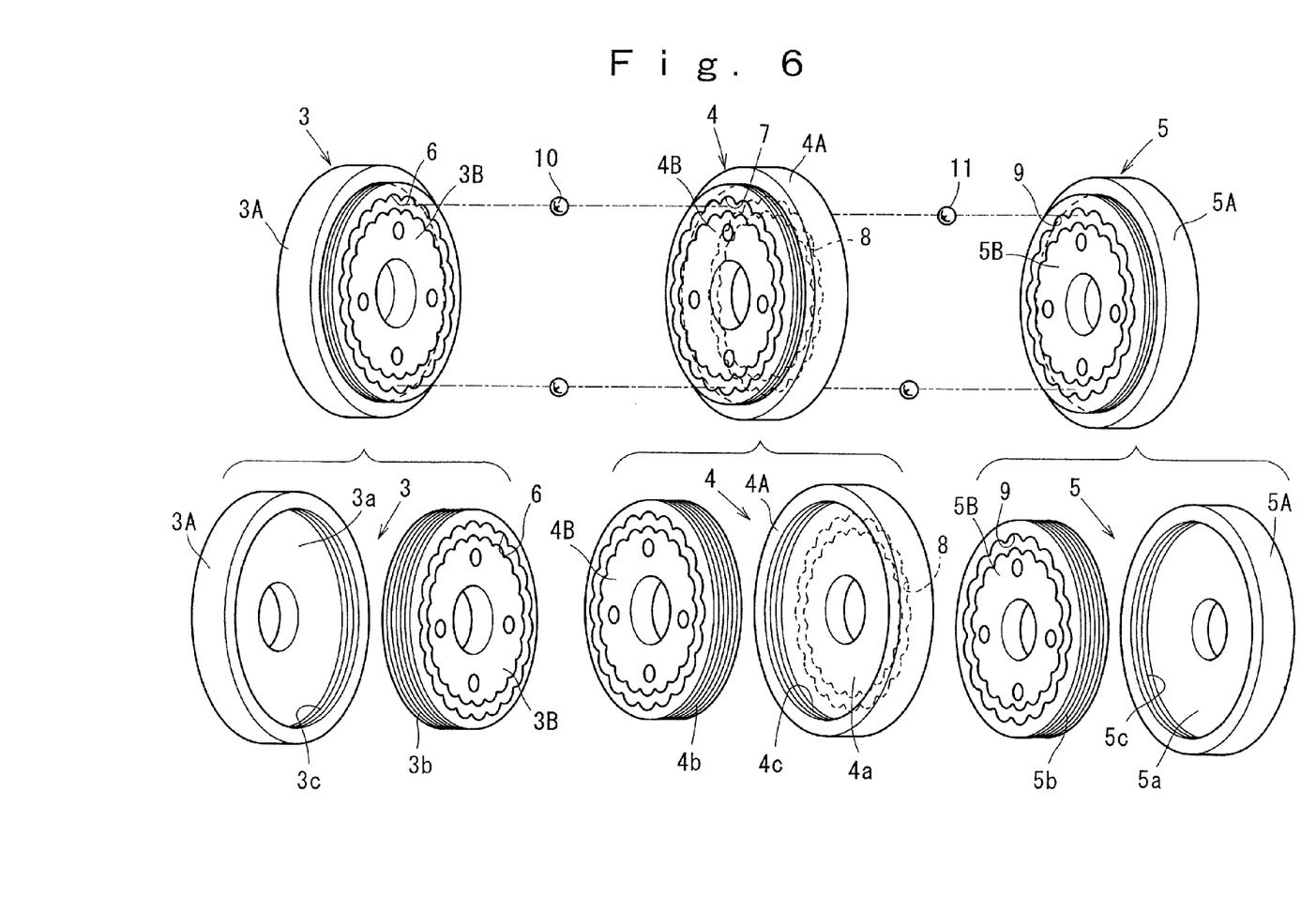
FIG. 6 is an exploded view of a stationary disc, an eccentric disc, an output disc, a main disc and an adjunctive disc according to a third embodiment of the invention.

FIG. 6 shows a third embodiment of the invention in which the epi-based groove 7 (9) and the hypo-based groove 6 (8) are arranged to be exchangeable with other ones.

The stationary disc 3 has a main disc plate 3A and an adjunctive disc plate 3B which carries the hypo-based groove 6. On one side surface of the main disc plate 3A, a circular recess 3a is provided in correspondence to the adjunctive disc plate 3B. A peripheral side surface of the adjunctive disc plate 3B has a male thread 3b, and an inner side wall of the recess 3a has an internal thread 3c in correspondence to the male thread 3b.

The adjunctive disc plate 3B is detachably mounted on the main disc plate 3A by turning the male thread 3b against the internal thread 3c in one direction and another direction. The male thread 3b is made in such a direction as to tighten against the internal thread 3c when the adjunctive disc plate 3B is subjected to the rotational transmission from the eccentric disc 4 during the speed reducing operation.

By preparing a plurality of adjunctive disc plates having the hypo based groove of different number of lobes, it becomes possible to readily set the desired speed reduction ratio by exchanging the adjunctive disc plate 3B with other one upon altering the speed reduction ratio.

The eccentric disc 4 has a main disc plate 4A and an adjunctive disc plate 4B. The main disc plate 4A carries the hypo-based groove 8, and the adjunctive disc plate 4B carries the epi-based groove 7. The main disc plate 4A has a circular recess 4a at one side surface opposite to the hypo-based groove 8 in correspondence to the adjunctive disc plate 4B.

A peripheral side surface of the adjunctive disc plate 4B has a male thread 4b, and an inner side wall of the recess 4a has an internal thread 4c in correspondence to the male thread 4b. The adjunctive disc plate 4B is detachably mounted on the main disc plate 4A by turning the male thread 4b against the internal thread 4c in one direction and another direction. The male thread 4b is made in such a direction as to tighten against the internal thread 4c when the adjunctive disc plate 4B is subjected to the speed reducing transmission.

With a plurality of adjunctive disc plates having the hypo-based groove of different number of lobes prepared beforehand, it becomes possible to readily set the desired speed reduction ratio by exchanging the adjunctive disc plate 4B with other one upon altering the speed reduction ratio.

In the meanwhile, the output disc 5 has a main disc plate 5A and an adjunctive disc plate 5B which carries the epi-based groove 9. On one side surface of the main disc plate 5A, a circular recess 5a is provided in correspondence to the adjunctive disc plate 5B. A peripheral side surface of the adjunctive disc plate 5B has a male thread 5b, and an inner side wall of the recess 5a has an internal thread 5c in correspondence to the male thread 5b.

The adjunctive disc plate 5B is detachably mounted on the main disc plate 5A by turning the male thread 5b against the internal thread 5c in one direction and another direction. The male thread 5b is made in such a direction as to tighten against the internal thread 5c when the adjunctive disc plate 5B is subjected to the rotational transmission from the eccentric disc 4 during the speed reducing operation.

With a plurality of adjunctive disc plates having the hypo-based groove of different number of lobes prepared in advance, it becomes possible to readily set the desired speed reduction ratio by exchanging the adjunctive disc plate 5B with other one upon altering the speed reduction ratio.

Instead of making each of the stationary disc 3, the eccentric disc 4 and the output disc 5 each by the main disc plate 3A (4A, 5A) and the adjunctive disc plate 3B (4B, 5B), any one or any dual combination of the stationary disc 3, the eccentric disc 4 and the output disc 5 may be made by the main disc plate and the adjunctive disc plate.

Figure 7:
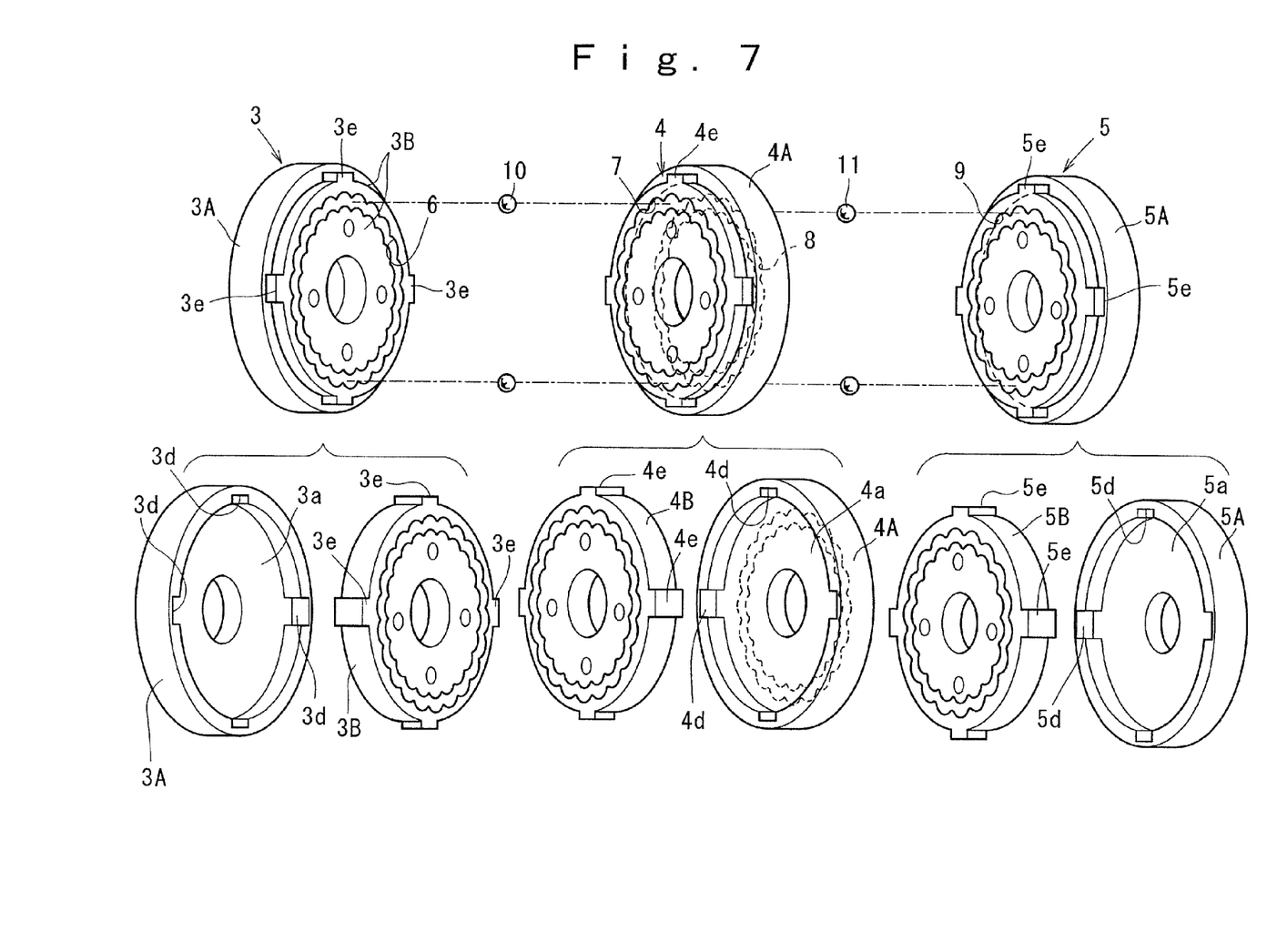
FIG. 7 is an exploded view of the stationary disc, the eccentric disc, the output disc, the main disc and the adjunctive disc according to a fourth embodiment of the invention.

FIG. 7 shows a fourth embodiment of the invention in which notches and lugs are provided, instead of the male thread 3b (4b, 5b) and the internal thread 3c (4c, 5c) of the third embodiment of the invention.

At a peripheral open end of the recess 3a in the main disc plate 3A, a plurality of notches 3d are circumferentially formed at regular intervals. At the outer side surface of the adjunctive disc plate 3B, a plurality of lugs 3e are circumferentially formed integrally in correspondence to the notches 3d. By operating the lugs 3e to engage with and disengage from the respective notches 3d, the operation enables the adjunctive disc plate 3B to detachably mount on the main disc plate 3A.

At a peripheral open end of the recess 4a in the main disc plate 4A, a plurality of notches 4d are circumferentially formed at regular intervals. At the outer side surface of the adjunctive disc plate 4B, a plurality of lugs 4e are circumferentially formed integrally in correspondence to the notches 4d. By operating the lugs 4e to engage and disengage against/from the respective notches 4d, the operation enables the adjunctive disc plate 4B to detachably mount on the main disc plate 4A.

At a peripheral open end of the recess 5a in the main disc plate 5A, a plurality of notches 5d are circumferentially formed at regular intervals. At the outer side surface of the adjunctive disc plate 5B, a plurality of lugs 5e are circumferentially formed integrally in correspondence to the notches 5d. By operating the lugs 5e to engage against and disengage from the respective notches 5d, the operation enables the adjunctive disc plate 5B to detachably mount on the main disc plate 5A.

It is to be noted that as a reverse case of the above, the notches (3d, 4d, 5d) may be defined on the adjunctive disc plate (3B, 4B, 5B), and the lugs (3e, 4e, 5e) may be defined on the main disc plate (3A, 4A, 5A).

With the structure as mentioned above, it is possible to attain the same advantages as insured by the third embodiment of the invention.

Figure 8:
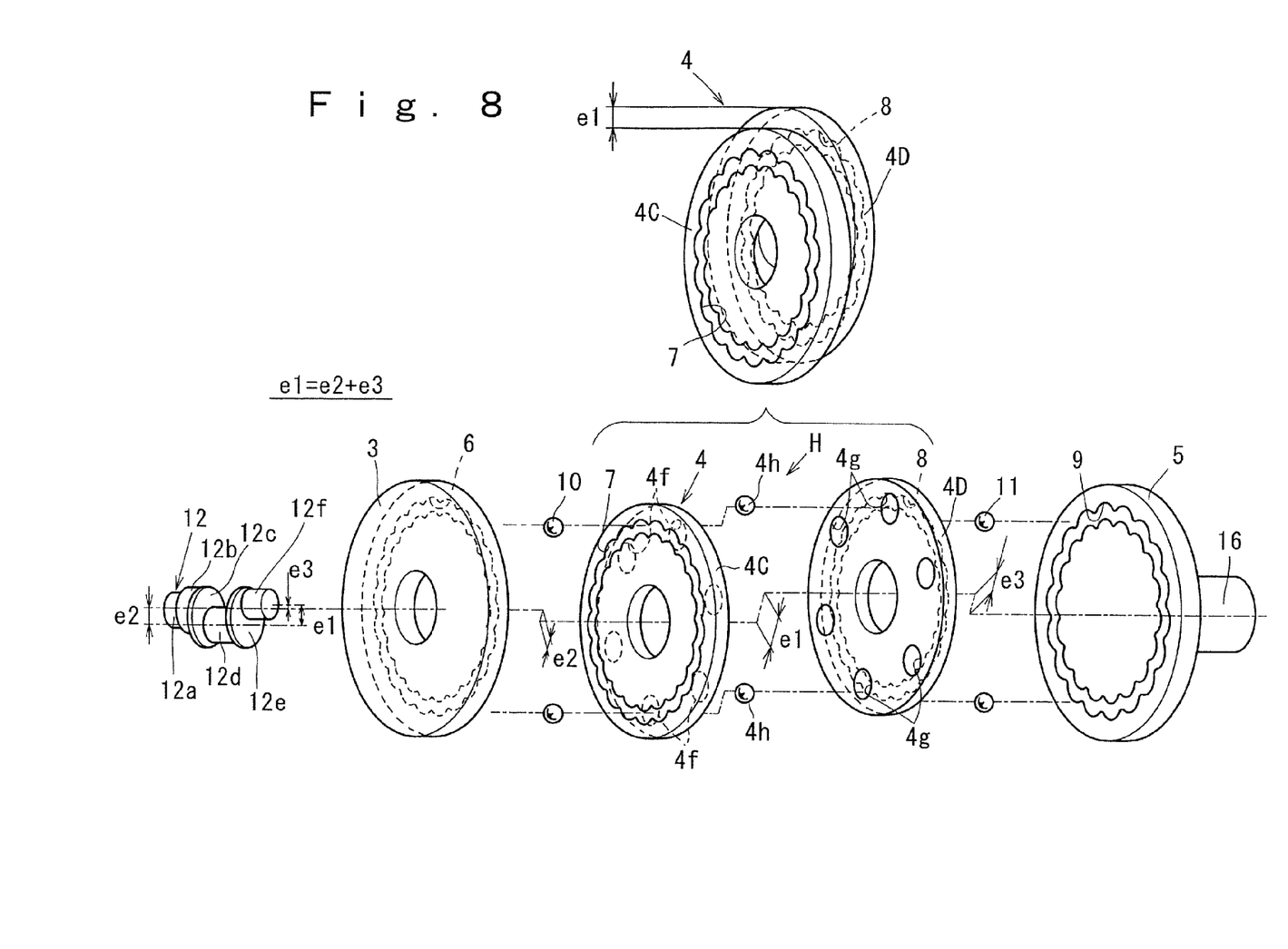
FIG. 8 is an exploded view of the eccentric shaft, the stationary disc, the eccentric disc, the output disc, the main disc and the adjunctive disc when the eccentric disc has first and second eccentric disc plates according to a fifth embodiment of the invention.
Figure 9:
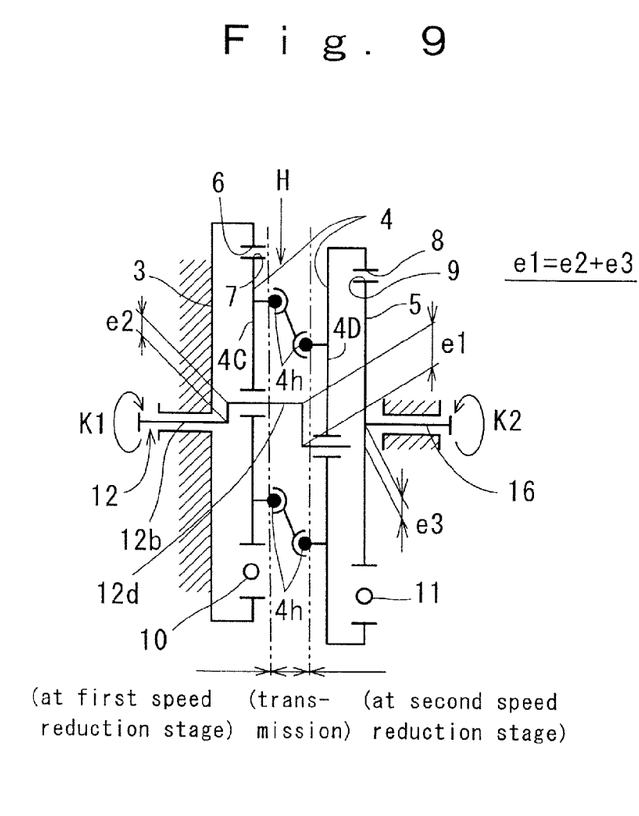
FIG. 9 is a schematic view of an equivalent model of the rolling ball type two-stage low speed changer device.
Figure 10:
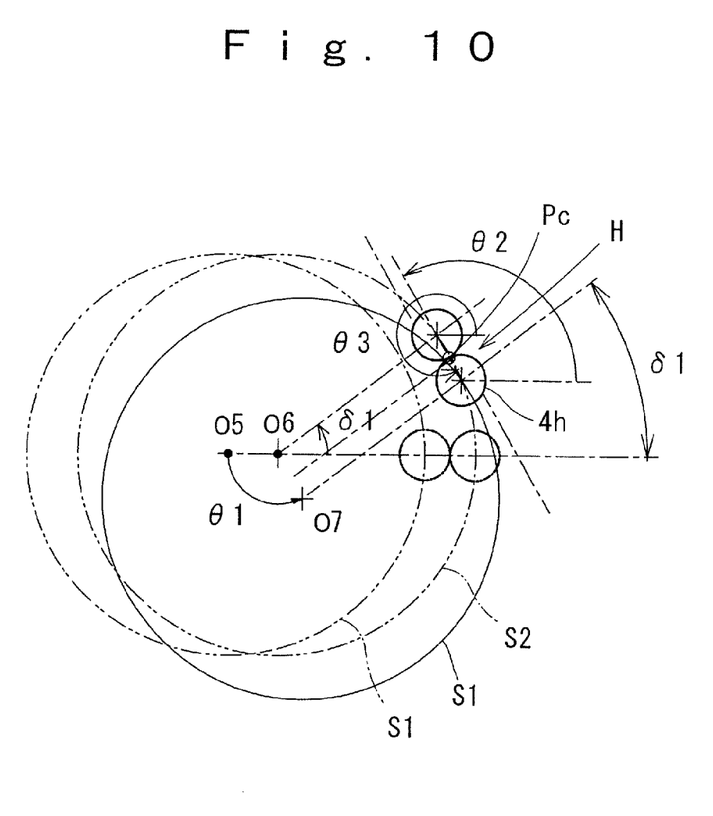
FIG. 10 is a schematic view depicted how to perform a torque transmission between opposed cavities through rollable balls in an adjustment coupler.

FIGS. 8 through 10 show a fifth embodiment of the invention in which the eccentric disc 4 has a first eccentric disc 4C and a second eccentric disc 4D with an adjustment coupler H interposed therebetween.

The first eccentric disc 4C has the epi-based groove 7, and the second eccentric disc 4D has the hypo-based groove 8 as shown in FIG. 8.

On the outer surface side opposite to the epi-based groove 7 of the first eccentric disc 4C, a plurality of circular cavities 4f are regularly provided along a basic circle (not shown). On the outer surface side opposite to the hypo-based groove 8 of the second eccentric disc 4D, a plurality of circular cavities 4g are provided along the basic circle equivalent to that of the cavities 4f.

Third rollable balls 4h are provided to form the adjustment coupler H together with the cavities 4f, 4g in which balls 4h rollably engage partly with a circumferential surface of the corresponding cavities 4f, while at the same time, rollably engaging partly with a circumferential surface of the corresponding cavities 4g.

The first eccentric disc 4C and the second eccentric disc 4D are juxtaposed with mutual phase shifted by 180 degrees angularly as an eccentricity e1.

As schematically represented by e1=e2+e3 in FIG. 9, the eccentricity e1 is a total value of an eccentricity e2 of the first eccentric disc 4C against the stationary disc 3 and an eccentricity e3 of the second eccentric disc 4D against the output disc 5.

Upon rotationally moving the first eccentric disc 4C, the third rollable balls 4h circulate within the respective cavities 4f, 4g, the balls 4h transmits the rotational component of the first eccentric disc 4C to the second eccentric disc 4D by the ratio of one to one, while absorbing their eccentric components.

Due to the phase shifted by 180 degrees ($\pi$) between the first eccentric disc 4C and the second eccentric disc 4D, Eccentric forces derived from the first and second eccentric discs 4C, 4D upon rotationally driving them are countervailed so as to effectively control an amount of vibration which would otherwise be produced due to their eccentric rotation.

This makes it unnecessary to provide the counter-weight portion 12c of the first embodiment of the invention as shown in FIG. 8. In FIG. 8, it is to be noted that the eccentric shaft 12 is downscaled in the same manner as described in the first embodiment of the invention.

As shown in FIG. 10, described is a principle how the first eccentric disc 4C transmits its rotational movement to the second eccentric disc 4D. When the first eccentric disc 4C is eccentrically rotated in a rotational direction to shift its basic circle S1 by a rotational input angle ($\theta_1$), it eccentrically rotates the basic circle S1 to such a manner as to shift its center from a point 05 to a point 07.

In accompany with the rotational movement of the first eccentric disc 4C, the second eccentric disc 4D is eccentrically rotated in a rotational direction to shift its basic circle S2 (06: center) by a first speed reduction angle ($\delta_1$) In this situation, a basic rotational angle ($\theta_2$) is equal to the rotational input angle ($\theta_1$), and rolling angle ($\theta_3$) of the third rollable balls 4h is equal to a total sum of the rotational input angle ($\theta_1$) and 180 degrees ($\pi$).

A meshing point Pc depicts a place in which each of the third rollable balls 4h engages with the circumferential surface of the cavities 4f, 4g, so that the first eccentric disc 4C transmits its rotational movement to the second eccentric disc 4D through the meshing point Pc.

Modification Forms (a) The hypo-based groove 6, 8 and the epi-based groove 7, 9 may be formed at its opposed sides into a tapered wall, gothic wall or V shaped wall in cross section.

(b) The main disc plates 3A, 4A, 5A and the adjunctive disc plates 3B, 4B, 5B in FIGS. 6, 7 may be employed to the stationary disc 3, the eccentric disc 4 and the output disc 5 in the second embodiment of the invention.

(c) The number of lobes z1, z2, z3, z4 derived from the hypo based groove 6, 8 and the epi-based groove 7, 9 may be altered as desired depending on the usage and speed reduction range required.

Although the invention has been described in its preferred embodiments with reference to a mechanical engineer, various changes or alterations may be made in the above apparatus without departing from the scope of the invention, it is intended that all matters contained in the above description or shown in the accompanying drawings shall be interpreted as illustrative and not in a limiting sense.

What is claimed is:

1. A rolling ball type two-stage low speed changer device comprising:

a stationary disc, one outer surface of which has a hypo-based groove defined along a hypocycloidal curve in a circumferential direction of said stationary disc, said hypo-based groove having a first number of lobes;

an eccentric disc, one outer surface of which has an epi-based groove defined along an epicycloidal curve in a circumferential direction of said eccentric disc, said epi-based groove opposing said hypo-based groove of said stationary disc and having a second number of lobes, the other surface of said eccentric disc having a hypo-based groove defined along a hypocycloidal curve in a circumferential direction of said eccentric disc and having a third number of lobes;

an output disc, one outer surface of which has an epi-based groove defined along an epicycloidal curve in a circumferential direction of said output disc, said epi-based groove opposing said hypo-based groove of said eccentric disc and having a fourth number of lobes;

an eccentric shaft interposed between said stationary disc and said output disc, and having one end portion, a middle portion and other end portion, said one end portion rotationally secured to a central portion of said stationary disc, said middle portion having an eccentric portion rotationally mounted on a central portion of said eccentric disc to pivotably support said eccentric disc, and said other end portion rotationally connected to a central portion of said output disc;

first rollable balls rollably placed between said stationary disc and said eccentric disc to partly engage with said hypo-based groove of said stationary disc and to partly engage with said epi-based groove of said eccentric disc;

second rollable balls rollably placed between said eccentric disc and said output disc to partly engage with said hypo-based groove of said eccentric disc and to partly engage with said epi-based groove of said output disc;

each of said first, second, third and fourth number of lobes being an integer, said first number of lobes being greater than said second number of lobes, and said third number of lobes being greater than said fourth number of lobes, each difference between said first and second number of lobes and between said third and fourth number of lobes being two with said third number of lobes equal to an integral multiple of half of said second number of lobes; and a rotational input given to said eccentric shaft eccentrically rotating said eccentric disc to roll said first rollable balls along said hypo-based groove of said stationary disc and said epi-based groove of said eccentric disc so as to implement a first stage speed change, while at the same time, rolling said second rollable balls along said hypo-based groove of said eccentric disc and said epi-based groove of said output disc so as to implement a second stage speed change.

2. The rolling ball type two-stage low speed changer device according to claim 1, wherein said stationary disc has a main disc and an adjunctive disc, the latter of which has said hypo-based groove and is detachably attached to said main disc to be exchangeable with other adjunctive disc having a different number of lobes from said hypo-based groove.

3. The rolling ball type two-stage low speed changer device according to claim 1, wherein said eccentric disc has a main disc having said epi-based groove and an adjunctive disc, the latter of which has said hypo-based groove and is detachably attached to said main disc to be exchangeable with other adjunctive disc having a different number of lobes from said hypo-based groove.

4. The rolling ball type two-stage low speed changer device according to claim 1, wherein said output disc has a main disc and an adjunctive disc, the latter of which has said epi-based groove and is detachably attached to said main disc to be exchangeable with other adjunctive disc having a different number of lobes from said epi-based groove.

5. The rolling ball type two-stage low speed changer device according to claim 1, wherein said stationary disc has a main disc and an adjunctive disc, the latter of which has said hypo-based groove and is detachably attached to said main disc to be exchangeable with other adjunctive disc having a different number of lobes from said hypo-based groove, and said eccentric disc has a main disc having said epi-based groove and an adjunctive disc, the latter of which has said hypo-based groove and is detachably attached to said main disc to be exchangeable with other adjunctive disc having a different number of lobes from said hypo-based groove.

6. The rolling ball type two-stage low speed changer device according to claim 1, wherein said stationary disc has a main disc and an adjunctive disc, the latter of which has said hypo-based groove and is detachably attached to said main disc to be exchangeable with other adjunctive disc having a different number of lobes from said hypo-based groove, and said output disc has a main disc and an adjunctive disc, the latter of which has said epi-based groove and is detachably attached to said main disc to be exchangeable with other adjunctive disc having a different number of lobes from said epi-based groove.

7. The rolling ball type two-stage low speed changer device according to claim 1, wherein said eccentric disc has a main disc having said epi-based groove and an adjunctive disc, the latter of which has said hypo-based groove and is detachably attached to said main disc to be exchangeable with other adjunctive disc having a different number of lobes from said hypo-based groove, and said output disc has a main disc and an adjunctive disc, the latter of which has said epi-based groove and is detachably attached to said main disc to be exchangeable with other adjunctive disc having a different number of lobes from said epi-based groove.

8. The rolling ball type two-stage low speed changer device according to claim 1, wherein said stationary disc has a main disc and an adjunctive disc, the latter of which has said hypo-based groove and is detachably attached to said main disc to be exchangeable with other adjunctive disc having a different number of lobes from said hypo-based groove, and said eccentric disc has a main disc having said epi-based groove and an adjunctive disc, the latter of which has said hypo-based groove and is detachably attached to said main disc to be exchangeable with other adjunctive disc having a different number of lobes from said hypo-based groove, and said output disc has a main disc and an adjunctive disc, the latter of which has said epi-based groove and is detachably attached to said main disc to be exchangeable with other adjunctive disc having a different number of lobes from said epi-based groove.

9. The rolling ball type two-stage low speed changer device according to claim 1, wherein said eccentric disc has a first eccentric disc plate having said epi-based groove and a second eccentric disc plate having said hypo-based groove each located to be angularly offset in phase by 180 degrees, said first eccentric disc plate having a plurality of circular cavities provided along a basic circle on a surface opposite to said epi-based groove, and said second eccentric disc plate having a plurality of circular cavities provided along a basic circle on a surface opposite to said hypo-based groove to form an adjustment coupler in which rollable balls are placed in said circular cavities of said first and second eccentric disc plate.

10. A rolling ball type two-stage low speed changer device comprising:
- a stationary disc, one outer surface of which has an epi-based groove defined along an epicycloidal curve in a circumferential direction of said stationary disc, said epi-based groove having a first number of lobes;
- an eccentric disc, one outer surface of which has a hypo-based groove defined along a hypocycloidal curve in a circumferential direction of said eccentric disc, said hypo-based groove opposing said epi-based groove of said stationary disc and having a second number of lobes, the other surface of said eccentric disc having an epi-based groove defined along an epicycloidal curve in a circumferential direction of said eccentric disc and having a third number of lobes;
- an output disc, one outer surface of which has a hypo-based groove defined along a hypocycloidal curve in a circumferential direction of said output disc, said hypo-based groove opposing said epi-based groove of said eccentric disc and having a fourth number of lobes;
- an eccentric shaft interposed between said stationary disc and said output disc, and having one end portion, a middle portion and other end portion, said one end portion rotationally secured to a central portion of said stationary disc, said middle portion having an eccentric portion rotationally mounted on a central portion of said eccentric disc to pivotably support said eccentric disc, and said other end portion rotationally connected to a central portion of said output disc;
- first rollable balls rollably placed between said stationary disc and said eccentric disc to partly engage with said epi-based groove of said stationary disc and to partly engage with said hypo-based groove of said eccentric disc;
- second rollable balls rollably placed between said eccentric disc and said output disc to partly engage with said epi-based groove of said eccentric disc and to partly engage with said hypo-based groove of said output disc;
- each of said first, second, third and fourth number of lobes being an integer, said second number of lobes being greater than said first number of lobes and said fourth number of lobes being greater than said third number of lobes, each difference between said second and first number of lobes and between said fourth and third number of lobes being two with said third number of lobes equal to an integral multiple of half of said second number of lobes; and
- a rotational input given to said eccentric shaft eccentrically rotating said eccentric disc to roll said first rollable balls along said epi-based groove of said stationary disc and said hypo-based groove of said eccentric disc so as to implement a first stage speed change, while at the same time, rolling said second rollable balls along said epi-based groove of said eccentric disc and said hypo-based groove of said output disc so as to implement a second stage speed change.

11. The rolling ball type two-stage low speed changer device according to claim 10, wherein said stationary disc has a main disc and an adjunctive disc, the latter of which has said epi based groove and is detachably attached to said main disc to be exchangeable with other adjunctive disc having a different number of lobes from said epi-based groove.

12. The rolling ball type two-stage low speed changer device according to claim 10, wherein said eccentric disc has a main disc having said hypo-based groove and an adjunctive disc, the latter of which has said epi-based groove and is detachably attached to said main disc to be exchangeable with other adjunctive disc having a different number of lobes from said epi-based groove.

13. The rolling ball type two-stage low speed changer device according to claim 10, wherein said output disc has a main disc and an adjunctive disc, the latter of which has said hypo-based groove and is detachably attached to said main disc to be exchangeable with other adjunctive disc having a different number of lobes from said hypo-based groove.

14. The rolling ball type two-stage low speed changer device according to claim 10, wherein said stationary disc has a main disc and an adjunctive disc, the latter of which has said epi-based groove and is detachably attached to said main disc to be exchangeable with other adjunctive disc having a different number of lobes from said epi-based groove, and said eccentric disc has a main disc having said hypo-based groove and an adjunctive disc, the latter of which has said epi-based groove and is detachably attached to said main disc to be exchangeable with other adjunctive disc having a different number of lobes from said epi based groove.

15. The rolling ball type two-stage low speed changer device according to claim 10, wherein said stationary disc has a main disc and an adjunctive disc, the latter of which has said epi-based groove and is detachably attached to said main disc to be exchangeable with other adjunctive disc having a different number of lobes from said epi-based groove, and said output disc has a main disc and an adjunctive disc, the latter of which has said hypo-based groove and is detachably attached to said main disc to be exchangeable with other adjunctive disc having a different number of lobes from said hypo-based groove.

16. The rolling ball type two-stage low speed changer device according to claim 10, wherein said eccentric disc has a main disc having said hypo-based groove and an adjunctive disc, the latter of which has said epi based groove and is detachably attached to said main disc to be exchangeable with other adjunctive disc having a different number of lobes from said epi-based groove, and said output disc has a main disc and an adjunctive disc, the latter of which has said hypo-based groove and is detachably attached to said main disc to be exchangeable with other adjunctive disc having a different number of lobes from said hypo-based groove.

17. The rolling ball type two-stage low speed changer device according to claim 10, wherein said stationary disc has a main disc and an adjunctive disc, the latter of which has said epi-based groove and is detachably attached to said main disc to be exchangeable with other adjunctive disc having a different number of lobes from said epi-based groove, and said eccentric disc has a main disc having said hypo-based groove and an adjunctive disc, the latter of which has said epi-based groove and is detachably attached to said main disc to be exchangeable with other adjunctive disc having a different number of lobes from said epi-based groove, and said output disc has a main disc and an adjunctive disc, the latter of which has said hypo-based groove and is detachably attached to said main disc to be exchangeable with other adjunctive disc having a different number of lobes from said hypo-based groove.

18. The rolling ball type two-stage low speed changer device according to claim 1 or 10, wherein a speed reduction ratio is expressed by $\{1-(z1 \times z3/z2 \times z4)\}$,
- wherein z1 is said first number of lobes,
- z2 is said second number of lobes,
- z3 is said third number of lobes, and
- z4 is said fourth number of lobes.

19. The rolling ball type two-stage low speed changer device according to claim 10, wherein said eccentric disc has a first eccentric disc plate having said hypo-based groove and a second eccentric disc plate having said epi-based groove each located to be angularly offset in phase by 180 degrees, said first eccentric disc plate having a plurality of circular cavities provided along a basic circle on a surface opposite to said hypo-based groove, and said second eccentric disc plate having a plurality of circular cavities provided along a basic circle on a surface opposite to said epi-based groove to form an adjustment coupler in which rollable balls are placed in said circular cavities of said first and second eccentric disc plate.

* * * * *